US007806182B2

(12) United States Patent
Waters et al.

(10) Patent No.: US 7,806,182 B2
(45) Date of Patent: Oct. 5, 2010

(54) STIMULATION METHOD

(75) Inventors: George Waters, Oklahoma City, OK (US); Paul R. Howard, Sugar Land, TX (US); Don Williamson, Katy, TX (US); John W. Still, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 97 days.

(21) Appl. No.: 12/253,373

(22) Filed: Oct. 17, 2008

(65) Prior Publication Data

US 2009/0107671 A1 Apr. 30, 2009

Related U.S. Application Data

(60) Provisional application No. 60/982,516, filed on Oct. 25, 2007.

(51) Int. Cl.
*E21B 21/06* (2006.01)
*E21B 43/26* (2006.01)
*E21B 43/267* (2006.01)

(52) U.S. Cl. ............... 166/280.2; 166/280.1; 166/300; 175/66; 507/904

(58) Field of Classification Search ............... 166/267, 166/280.1, 280.2, 281, 295, 300, 308.1, 308.2; 175/66; 405/129.35, 129.4; 507/904
See application file for complete search history.

(56) References Cited

U.S. PATENT DOCUMENTS 3,804,760 A * 4/1974 Darley ................. 507/240
4,366,063 A * 12/1982 O'Connor ............. 210/652
4,483,399 A * 11/1984 Colgate ................ 166/308.1
5,108,226 A * 4/1992 Jennings, Jr. .......... 405/129.4
5,213,446 A * 5/1993 Dovan ................. 405/129.3
6,762,154 B2 * 7/2004 Lungwitz et al. ........ 507/131
6,913,080 B2  7/2005 Lehman et al.
7,022,240 B2 * 4/2006 Hart et al. ............. 210/712
7,225,879 B2  6/2007 Wylie et al.
7,398,826 B2  7/2008 Hoefer et al.
7,431,106 B2 * 10/2008 Alberty et al. .......... 175/72
7,621,328 B1 * 11/2009 Case et al. ............. 166/279
2004/0018943 A1 * 1/2004 Pyecroft et al. .......... 507/100
2004/0149431 A1  8/2004 Wylie et al.
2005/0241855 A1  11/2005 Wylie et al.
2006/0157282 A1  7/2006 Tilton et al.
2006/0254826 A1 * 11/2006 Alberthy ............... 175/72
2007/0155630 A1 * 7/2007 Hoch et al. ............. 507/202
2007/0187146 A1  8/2007 Wylie et al.
2008/0053896 A1 * 3/2008 Shafer et al. ............ 210/605
2008/0087423 A1  4/2008 Wylie et al.
2008/0248975 A1 * 10/2008 Mazard et al. ........... 507/227
2009/0065198 A1  3/2009 Suarez-Rivera et al.
2009/0105097 A1  4/2009 Abad et al.
2009/0107671 A1  4/2009 Waters et al.

* cited by examiner

*Primary Examiner*—George Suchfield
(74) *Attorney, Agent, or Firm*—David Cate; Robin Nava; Jeff Griffin

(57) ABSTRACT

A subterranean formation stimulation method utilizes a treatment fluid comprising residual drilling fluid injected into the formation, and producing the stimulated formation. In one embodiment, a tight gas formation is fractured and the fracture has a higher conductivity than the formation.

23 Claims, No Drawings

STIMULATION METHOD

CROSS REFERENCE TO RELATED APPLICATIONS

This application is a non-provisional of and claims the benefit of priority to U.S. 60/982,516, filed Oct. 25, 2007.

BACKGROUND OF THE INVENTION

The present invention relates to the stimulation of very low permeability formations.

Hydraulic fracturing of very low permeability formations, also known as tight formations (including tight gas formations), such as the Barnett, Woodford, or Fayetteville shale formations, is common. At present it is estimated that there are hundreds of rigs operating in the Barnett shale alone. Wells are drilled horizontally to access the tight formations and production is then stimulated by one or usually a plurality of fracture treatments.

The wells are drilled with various types of drilling fluids. Residual drilling fluid present upon the completion of drilling is approximately 240 m$^3$ at each rig (1500 bbl/rig). When the well is complete the residual drilling fluids must be disposed of at relatively high cost per unit volume (m$^3$ or bbl).

In the mid 1990's, most of the tight gas reservoirs were fractured utilizing crosslinked gelled fluids. In an effort to reduce treatment costs, slick water fracturing has emerged as the method of choice.

The fracturing treatments of tight formations are characterized by extended fracture closure times where the fracture may remain open for hours after injection ceases. The tight formations of interest have permeability on the order of several hundred nanodarcy, so fluid-induced damage to the fracture face from leakoff of fracturing fluids is not always a concern. These shale formations have such low permeability that the wells can be effectively stimulated with only a minimal final fracture conductivity, on the order of 0.3 to 3 mD-m (1 to 10 mD-ft). Consequently fracturing fluid typically contains no or only small quantities of solids, e.g., 100 mesh sand, 40/70 mesh sand, or 30/50 mesh sand as proppant, and has low viscosity, e.g., slick water, which can also facilitate a reduced fracture height growth because of the lower viscosity.

Whereas fracture treatments on moderate or highly conductive formations can involve 950 m$^3$ (6000 bbl) of fluid and 45-90 metric tons (100,000-200,000 pounds) of proppant; in a typical tight gas treatment, thousands of cubic meters (several million gallons) of water are pumped at a typical rate of 10 m$^3$/minute (65 bbl/min (bpm)) with sand ranging in concentration from 0.03 g/mL to 0.12 g/mL (0.25 to 1.0 lb/gal (ppg)), and other additives including scale inhibitor, friction reducers, biocides, clay swelling inhibitors, oxygen scavengers, surfactants and the like.

The published data show that 60 to 90% of the injected fluids commonly stay in the tight gas reservoirs after the stimulated well is placed in production. It is likely that large quantities are trapped in the area surrounding the fracture and within the fracture itself.

The statements in the preceding section merely provide background information related to the present disclosure and may not constitute prior art.

SUMMARY

In an embodiment, the present invention relates to treating a formation with a treatment fluid comprising residual drilling fluid to stimulate the production of reservoir fluids such as gas and/or oil from the formation.

DESCRIPTION OF SOME EMBODIMENTS

The invention in one embodiment relates to a method, which can be used to stimulate reservoir fluid production. In an embodiment, the method can include the steps of: fracturing a tight gas formation wherein a treatment fluid comprising residual drilling fluid (RDF) is injected into the formation to form a fracture with a consolidated proppant pack having a relatively higher conductivity than the formation; and producing gas, gas condensate or a combination thereof from the formation through the fracture and into a production conduit in fluid communication therewith. In an embodiment, the proppant pack has a dimensionless conductivity ($F_{cD}$) of at least about 2, preferably in a range of from about 5 to about 10, wherein $F_{cD}=(k_f)(W)/(k_r)(L)$, wherein $k_f$ is permeability of the proppant pack, W is width of the fracture, $k_r$ is permeability of the tight subterranean formation, and L is length of the fracture, wherein $k_r$ is less than 1 millidarcy, or less than 100 microdarcy.

In an alternative or additional embodiment, the method can include the steps of: drilling a borehole into a subterranean formation; recovering RDF from the drilling step; stimulating a pay zone in the subterranean formation by injecting a treatment fluid into the pay zone; supplying the RDF from the recovery step to the treatment fluid for the pay zone stimulation step; producing hydrocarbon from the stimulated pay zone.

In an alternative or additional embodiment, the method can include the steps of: drilling a borehole into a tight subterranean formation; recovering RDF from the drilling step; repeatedly stimulating a pay zone in the tight subterranean formation by a series of successive injections of treatment fluid into the pay zone to form a plurality of fractures; supplying the RDF from the RDF recovery step to the treatment fluid for one or more of the injections in the pay zone stimulation step; recovering a portion of treatment fluid used in one or more of the injections; supplying the used treatment fluid from the treatment fluid recovery step to the treatment fluid for a later one or more of the successive injections; producing hydrocarbon from the stimulated pay zone.

In an embodiment, the subterranean formation comprises shale. In another embodiment, the method is applicable to subterranean formations having a permeability less than 1 millidarcy, less than 100 microdarcy, less than 10 microdarcy, less than 1 microdarcy, or less than 500 nanodarcy.

In an embodiment, the treatment can form a fracture in the pay zone having $F_{cD}$ of at least about 0.1, preferably at least about 2, and more preferably in a range of from about 5 to about 10, wherein $F_{cD}$ is defined above.

In an embodiment, the stimulation step can include hydraulic fracturing of the pay zone.

In an embodiment, the treatment fluid comprises the neat RDF. In another embodiment, the treatment fluid comprises a ratio of from 100:1 to 1:1000 by volume of residual drilling fluid to volume of diluent fluid, where diluent fluid is the portion of the total treatment fluid other than the RDF.

In an embodiment, supplying the RDF to the stimulation step disposes of substantially all of the RDF. In an alternate or additional embodiment, the method can include well-site storage of the RDF between the recovery and stimulation steps. In one embodiment, the method can further comprise importing RDF from a remote well site location, e.g., another drilling operation, to the treatment fluid for the pay zone stimulation step.

In an embodiment, the method can include the step of conditioning the RDF for a property selected from the group consisting of pH, viscosity, density, solids content, salinity and the like, and any combination thereof. Alternatively or additionally, the method can include the step of mixing an additive into the treatment fluid, wherein the additive is selected from the group consisting of proppants, thickeners, breakers, activators, pH control agents, biocides, corrosion inhibitors electrolytes, and the like, and any combination thereof.

In an embodiment, the stimulation step comprises a slickwater treatment stage, i.e., one or more treatment stages wherein slickwater is used as the treatment fluid. Alternatively or additionally, the stimulation step comprises injection of the treatment fluid in stages comprising an RDF-rich treatment fluid stage and an RDF-lean treatment fluid stage. In one embodiment, the treatment fluid comprises stimulation fluid recovered from a previous stimulation treatment at the same or a different well or formation.

In an embodiment, the produced hydrocarbon can be any gas or liquid hydrocarbon. In an embodiment, the produced hydrocarbon comprises gas, gas condensate, or a combination thereof.

In an embodiment, the treatment can include resin consolidation of proppant in a fracture, e.g., adjacent the borehole. Proppant consolidation can inhibit proppant flowback, and can also enhance the conductivity of the proppant pack in the fracture. In one embodiment, at least one stage of the treatment fluid comprises resin-coated proppant suspended therein, such as, for example, in a tail stage. In another embodiment, resin can be introduced into a stage to consolidate the proppant.

In an embodiment, the RDF is recovered from a drilling operation to form a borehole penetrating the tight gas formation, wherein the production conduit is disposed in the borehole. Alternatively or additionally, the RDF can be supplied from a remote well site drilling operation.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure.

The present description and examples are presented solely for the purpose of illustrating the various embodiments and should not be construed as a limitation to the scope and applicability of the invention. While the various embodiments are described herein as comprising or relating to certain materials, it should be understood that the individual materials could optionally comprise two or more chemically different materials. In addition, the embodiments can also relate to some components other than the ones already cited.

In this detailed description, each numerical value should be read once as modified by the term "about" (unless already expressly so modified), and then read again as not so modified unless otherwise indicated in context. Also, it should be understood that a concentration range listed or described as being useful, suitable, or the like, is intended and that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

The invention relates to the use of RDF, which would normally require disposal, to fracture shale or other tight formations. RDF can include previously used drilling fluid from drilling a well that no longer meets the drilling fluid requirements, drilling fluid that is left over when the drilling operation is completed, including both drilling fluid prepared but not used because it exceeded the volume required for drilling and recirculated drilling fluid recovered at the end of the drilling operation, or the like.

The compositions of the drilling fluids vary, but in one embodiment, the particular RDF composition is not a limitation of the invention. One example of a drilling fluid is polymer thickened brine solution with suspended solids. Oil base drilling fluids, oil-in-water emulsions and water-in-oil invert emulsions, can also be used. As used herein "oil base" includes mineral oils, diesel and synthetic oils.

RDF is applicable to hydraulic fracturing of tight formations because of their extremely low permeability. In an embodiment, the typical concerns about formation damage at the fracture face are not applicable in these low permeability formations. The RDFs may be used in the fracture treatment alone or in combination with other fluids, including fluids that have previously been used in stimulation treatments and recovered, e.g., by backflow or production. The RDF may also be diluted in another treatment or fracturing fluid. Further additives such as viscosifiers and proppant may be added to the RDF to improve it before the fracturing treatment, or to facilitate its break at the end of the fracturing treatment or other function.

In some embodiments, the invention relates to RDF from the drilling process which is used as a treatment fluid to fracture very low permeability reservoirs such as the Barnett shale. The drilling fluid in one embodiment is used untreated as a sole fluid or in staged combinations with conventional low permeability fracturing fluids like slickwater. The RDF in an alternate or additional embodiment is diluted in other treatment fluids, or in fluids that have been previously used in stimulation treatments.

The treatment fluids may be water based, oil based, or a combination of the two, i.e., an emulsion or invert emulsion. The treatment fluid is energized or foamed in one embodiment, and may incorporate a gas such as nitrogen, air, natural gas or carbon dioxide, or the like, or a mixture thereof. Further the RDF may be treated before being used as a fracturing fluid, or combined with a slow release acid or base to break and dissolve its polymeric and inorganic components. The advantage is that the RDF normally requires disposal at considerable expense, so its use as a fracturing fluid reduces costs, both the cost of disposing of the drilling fluid, and the cost of formulating a new fracturing fluid. Additional polymers and proppant in one embodiment are added to the RDF for its use in hydraulic fracturing.

In embodiments, the drilling fluids are water based or oil based, and as a mixture, the drilling fluid can be an emulsion, or an invert emulsion. When the RDF is used in the treatment fluid, in embodiments, the treatment fluid can similarly be aqueous where the RDF is aqueous, or oil-base where the RDF is oil-base. In another embodiment, the treatment fluid can be an emulsion or invert emulsion where mixed phases are present, such as, for example, where the RDF comprises an emulsion or invert emulsion, or where the drilling fluid is oil-base or comprises an oil-base phase (emulsion or invert emulsion) and the treatment fluid also includes aqueous components.

Adding rheology modifiers, variously known as polymers, surfactants, friction reducers, thickeners or viscosifiers, to the drilling fluid, or the treatment fluid comprising the RDF, can in an embodiment, increase the viscosity, reduce pumping friction and/or help carry proppant. The rheology modifier can be added to the drilling fluid as a component present to enhance rheology during the drilling operation, and the RDF modifier can then also enhance or facilitate enhancement of the rheology of the treatment fluid when used alone or together with an additional amount or type of thickener added to the treatment fluid.

Breakers can be added to the treatment fluid to degrade polymeric or acid soluble components in the treatment fluid post fracture. Any suitable breakers are used, including, but not limited to, solid acid precursors, for example, polyglycolic acid (PGA) or polylactic acid (PLA) particles such as beads, plates, or fibers, other delayed acids, delayed oxidizers or delayed bases. Adding breakers, with or without breaker activators, to the fluids prior to the fracturing process may be done with the purpose of reducing viscosity, degrading fluid components and aiding fluid flowback after the fracture treatment. Also, encapsulated breakers and/or activators may be used.

The RDFs described above may be diluted or mixed with other treatment fluids or treatment fluid components, for example, treatment fluids or components used in a hydraulic fracturing treatment. In one embodiment, the residual treatment fluid is mixed into or diluted with treatment fluid so that the overall properties of the final treatment fluid are not adversely impacted by the RDF, for example, so that the RDF comprises no more than 0.1 percent by volume in the final treatment fluid or stage thereof, or no more than 1, 2, 5, 10, 20, 25, 30, 40 or 50 percent by volume in the final treatment fluid or stage thereof. In an embodiment, the volumetric ratio of RDF:diluents in the treatment fluid (where diluents include any fluid component in the treatment fluid other than the RDF) ranges from 100:1 to 1:1000 by volume, from 10:1 to 1:100, from 1:1 to 1:50, or the like. In an embodiment, the RDF can be diluted into the treatment fluid at the beginning or shortly after the beginning of the treatment operation and the dilution continued until the available RDF is exhausted, and thereafter the treatment fluid can be free of RDF.

The RDF-containing treatment fluid, in an embodiment, is pumped ahead of an RDF-free treatment fluid, for example as a pad, or behind another treatment fluid as a carrier fluid itself or diluted in a carrier fluid, for example, with added proppant. Also, stages of RDF or RDF-containing treatment fluids can be alternated with stages of RDF-free treatment fluids during the fracturing treatment in any order or in as many small alternating stages as is effective.

Treatment fluids useful in embodiments of the invention include a rheology modifier that may be provided as a component of the RDF or added as a separate component or treatment fluid additive. In one embodiment, the rheology modifier used in the drilling fluid, e.g. as a thickener, can conveniently function as a rheology modifier in the treatment fluid, e.g., as a thickener and/or friction reducer, or it can be the same class of rheology modifier or otherwise compatible therewith. In another embodiment, the rheology modifier used in the RDF does not contribute appreciably to the rheology modification of the treatment fluid, for example, by high dilution, or is supplemented or replaced by an additional quantity of rheology modifier as a separately added component in the treatment fluid.

The rheology modifier may be a polymer that is either crosslinked or uncrosslinked (sometimes referred to in the art as a linear polymer or gel), or any combination thereof. Many polymers are commonly used to thicken or otherwise modify the rheology of treatment fluids such as gravel packing and fracturing fluids. Polymers include natural polymers, derivatives of natural polymers, synthetic polymers, biopolymers, and the like, or any mixtures thereof. An embodiment uses any viscosifying polymer used in the oil industry to form gels. Some non-limiting examples of suitable polymers include: polysaccharides, such as, for example, guar gums, high-molecular weight polysaccharides composed of mannose and galactose sugars, including guar derivatives such as hydroxypropyl guar (HPG), carboxymethyl guar (CMG), carboxymethylhydroxypropyl guar (CMHPG), cationic guar (for example, quaternary ammonium derivative such as guar hydroxytrimonium chloride), and other polysaccharides such as xanthan, diutan, and scleroglucan; cellulose derivatives such as hydroxyethyl cellulose (HEC), hydroxypropyl cellulose (HPC), carboxymethlyhydroxyethyl cellulose (CM-HEC), and the like; synthetic polymers such as, but not limited to, acrylic and methacrylic acid, ester and amide polymers and copolymers, polyalkylene oxides such as polymers and copolymers of ethylene glycol, propylene glycol or oxide, and the like. The polymers are preferably water soluble. Also, associative polymers for which viscosity properties are enhanced by suitable surfactants and hydrophobically modified polymers can be used, such as cases where a charged polymer in the presence of a surfactant having a charge that is opposite to that of the charged polymer, the surfactant being capable of forming an ion-pair association with the polymer resulting in a hydrophobically modified polymer having a plurality of hydrophobic groups, as described in US 2004209780.

As used herein, when a polymer is referred to as comprising a monomer or comonomer, the monomer is present in the polymer in the polymerized form of the monomer or in the derivative form of the monomer. However, for ease of reference the phrase comprising the (respective) monomer or the like may be used as shorthand. Also herein, the terms linear and non-crosslinked are used interchangeably in reference to polymers to indicate that there are no chemical interconnections between the polymer chains, even though the polymer may have pendant groups or short chain branching from the backbone.

In some cases, the polymer or polymers are formed of a linear, nonionic, hydroxyalkyl galactomannan polymer or a substituted hydroxyalkyl galactomannan polymer. Examples of useful hydroxyalkyl galactomannan polymers include, but are not limited to, hydroxy-$C_1$-$C_4$-alkyl galactomannans, such as hydroxy-$C_1$-$C_4$-alkyl guars. Preferred examples of such hydroxyalkyl guars include hydroxyethyl guar (HE guar), hydroxypropyl guar (HP guar), and hydroxybutyl guar (HB guar), and mixed $C_2$-$C_4$, $C_2/C_3$, $C_3/C_4$, or $C_2/C_4$ hydroxyalkyl guars. Hydroxymethyl groups can also be present in any of these.

When incorporated in the well treatment or other fluid, the polymers may be present at any suitable concentration. In various embodiments hereof, the polymer can be present in an amount of from about 0.01 g/L of fluid (0.1 lb/1000 gal of fluid (ppt)) to less than about 7.2 g/L (60 ppt), or from about 0.018 to about 4.8 g/L (about 1.5 to about 40 ppt), from about 0.018 to about 4.2 g/L (about 1.5 to about 35 ppt), or from 0.018 to about 3 g/L (1.5 to about 25 ppt), or even from about 0.24 to about 1.2 g/L (about 2 to about 10 ppt). In other embodiments, the polymer is present in the treatment fluid at a rate within a range of from any lower limit selected from 0.0001, 0.001, 0.01, 0.025, 0.05, 0.1, or 0.2 percent by weight of the liquid phase, up to any higher upper limit selected from 1.0, 0.5, 0.4, 0.25, 0.2, 0.15 or 0.1 percent by weight of the liquid phase.

In one embodiment, the polymer comprises a heteropolysaccharide. While any suitable heteropolysaccharide may be used, microbial polysaccharides commonly known as sphingans are particularly useful. Sphingans generally are acidic capsular heteropolysaccharides secreted by Sphingomonas bacteria as described by Pollock, T. J., Sphingan Group of Exopolysaccharides (EPS), in Biopolymers, Vol. 5, E. J. Vandamme, S. DeBaets, and A. Steinbüchel, Editors. 2002, Wiley-VCH Verlag GmbH, p. 239-258. Exemplary sphingans include gellan gum, welan gum, diutan gums (S-657, S-657/pS8, etc.), rhamsan gum, heteropolysaccharide S-88, heteropolysaccharide S-198, heteropolysaccharide NW11, and the like. Heteropolysaccharides are incorporated into the fluid embodiments of the invention, separately or together with any added RDF, in amounts ranging from about 0.01% to about 1.0% by weight of total weight of liquid phase, and preferably from about 0.10% to about 0.40% by weight of total weight of liquid phase.

While linear or non-crosslinked polymer systems can be used in an embodiment, they generally require higher polymer levels for the same rheological modification. In some embodiments, the fluids used may further include a crosslinker. Adding crosslinkers to the fluid may further augment the viscosity of the fluid. Crosslinking consists of the attachment of two polymeric chains through the chemical association of such chains to a common element or chemical group. Suitable crosslinkers may comprise a chemical compound containing a polyvalent ion such as, but not necessarily limited to, boron or a metal such as chromium, iron, aluminum, titanium, antimony and zirconium, or mixtures of polyvalent ions. Suitable boron crosslinked polymers systems include by non-limiting example, guar and substituted guars crosslinked with boric acid, sodium tetraborate, and encapsulated borates; borate crosslinkers may be used with buffers and pH control agents such as sodium hydroxide, magnesium oxide, sodium sesquicarbonate, and sodium carbonate, amines (such as hydroxyalkyl amines, anilines, pyridines, pyrimidines, quinolines, and pyrrolidines), and carboxylates such as acetates and oxalates; and with crosslink delay agents such as sorbitol, aldehydes, and sodium gluconate.

Suitable zirconium crosslinked polymer systems include by non-limiting example, those crosslinked by zirconium complexes such as lactates (for example sodium zirconium lactate), triethanolamines, 2,2'-iminodiethanol, amino acids, and with mixtures of these ligands, including when adjusted with bicarbonate. Suitable titanates include by non-limiting example, lactates and triethanolamines, and mixtures, for example delayed with hydroxyacetic acid.

The rheology modifiers in one embodiment can include surfactants, such as cationic, amphoteric, and zwitterionic viscoelastic surfactant systems, that can function at low concentrations as friction reducers, which are of great interest in slickwater treatment fluids, and at higher concentrations can form a viscoelastic system of entangled micellar structures that act as thickeners or viscosifiers.

In an embodiment, suitable zwitterionic surfactants have the formula:

RCONH—$(CH_2)_a(CH_2CH_2O)_m(CH_2)_b$—$N^+(CH_3)_2$—$(CH_2)_{a'}(CH_2CH_2O)_{m'}(CH_2)_{b'}COO^-$ in which R is an alkyl group that contains from about 11 to about 27 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to 10 if m is 0; a' and b' are each 1 or 2 when m' is not 0 and (a'+b') is from 1 to 5 if m is 0; (m+m') is from 0 to 14; and $CH_2CH_2O$ may also be $OCH_2CH_2$.

In an embodiment, zwitterionic surfactants include betaines. Two suitable examples of betaines are BET-O and BET-E. The surfactant in BET-O-30 is shown below; one chemical name is oleylamidopropyl betaine. It is designated BET-O-30 because as obtained from the supplier (Rhodia, Inc. Cranbury, N.J., U.S.A.) it is called Mirataine BET-O-30 because it contains an oleyl acid amide group (including a $C_{17}H_{33}$ alkene tail group) and contains about 30% active surfactant; the remainder is substantially water, sodium chloride, and propylene glycol. An analogous material, BET-E-40, is also available from Rhodia and contains an erucic acid amide group (including a $C_{21}H_{41}$ alkene tail group) and is approximately 40% active ingredient, with the remainder being substantially water, sodium chloride, and isopropanol. The surfactant in BET-E-40 is also shown below; one chemical name is erucylamidopropyl betaine. As-received concentrate of BET-E-40 was used in the experiments reported below, where it will be referred to as "VES." BET surfactants, and other VES's that are suitable for the present Invention, are described in U.S. Pat. No. 6,258,859. According to that patent, BET surfactants make viscoelastic gels when in the presence of certain organic acids, organic acid salts, or inorganic salts; in that patent, the inorganic salts were present at a weight concentration up to about 30 weight % of the liquid portion of the system. Co-surfactants may be useful in extending the brine tolerance, and to increase the gel strength and to reduce the shear sensitivity of the VES-fluid, in particular for BET-O-type surfactants. An example given in U.S. Pat. No. 6,258,859 is sodium dodecylbenzene sulfonate (SDBS), also shown below. Other suitable co-surfactants include, for example those having the SDBS-like structure in which x=5-15; preferred co-surfactants are those in which x=7-15. Still other suitable co-surfactants for BET-O-30 are certain chelating agents such as trisodium hydroxyethylethylenediamine triacetate. The rheology enhancers of the present invention may be used with viscoelastic surfactant fluid systems that contain such additives as co-surfactants, organic acids, organic acid salts, and/or inorganic salts.

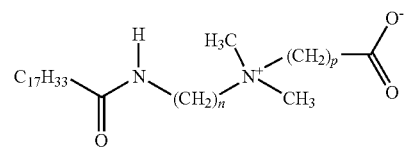

Surfactant in BET-O-30 (when n=3 and p=1)

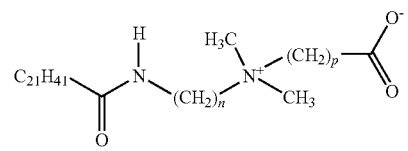

Surfactant in BET-E-40 (when n=3 and p=1)

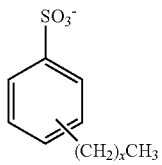

SDBS (when x=11 and the counterion is Na$^+$)

Some embodiments use betaines; such as BET-E-40. Mixtures of betaines, especially BET-E-40, with other surfactants are also suitable.

Other embodiments of betaines include those in which the alkene side chain (tail group) contains 17-23 carbon atoms (not counting the carbonyl carbon atom) which may be branched or straight chained and which may be saturated or unsaturated, n=2-10, and p=1-5, and mixtures of these compounds. Another embodiment relates to betaines in which the alkene side chain contains 17-21 carbon atoms (not counting the carbonyl carbon atom) which may be branched or straight chained and which may be saturated or unsaturated, n=3-5, and p=1-3, and mixtures of these compounds. These surfactants are used at a concentration of about 0.5 to about 5 weight %, preferably from about 1 to about 2.5 weight % (concentration of as-received viscoelastic surfactant concentrate in the final fluid).

Exemplary cationic viscoelastic surfactants include the amine salts and quaternary amine salts disclosed in U.S. Pat. Nos. 5,979,557 and 6,435,277, which have a common Assignee as the present application and which are hereby incorporated by reference.

Examples of suitable cationic viscoelastic surfactants include cationic surfactants having the structure:

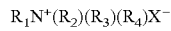

$R_1N^+(R_2)(R_3)(R_4)X^-$ in which $R_1$ has from about 14 to about 26 carbon atoms and may be branched or straight chained, aromatic, saturated or unsaturated, and may contain a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5-or 6-member ring structure which includes the nitrogen atom; the $R_2$, $R_3$ and $R_4$ groups may be the same or different; $R_1$, $R_2$, $R_3$ and/or $R_4$ may contain one or more ethylene oxide and/or propylene oxide units; and $X^-$ is an anion. Mixtures of such compounds are also suitable. As a further example, $R_1$ is from about 18 to about 22 carbon atoms and may contain a carbonyl, an amide, or an amine, and $R_2$, $R_3$, and $R_4$ are the same as one another and contain from 1 to about 3 carbon atoms.

Cationic surfactants having the structure $R_1N^+(R_2)(R_3)(R_4)$ $X^-$ may optionally contain amines having the structure $R_1N(R_2)(R_3)$. It is well known that commercially available cationic quaternary amine surfactants often contain the corresponding amines (in which $R_1$, $R_2$, and $R_3$ in the cationic surfactant and in the amine have the same structure). As received commercially available VES surfactant concentrate formulations, for example cationic VES surfactant formulations, may also optionally contain one or more members of the group consisting of alcohols, glycols, organic salts, chelating agents, solvents, mutual solvents, organic acids, organic acid salts, inorganic salts, oligomers, polymers, co-polymers, and mixtures of these members.

Another embodiment of a cationic VES is erucyl bis(2-hydroxyethyl) methyl ammonium chloride, also known as (Z)-13 docosenyl-N—N-bis(2-hydroxyethyl) methyl ammonium chloride. It is commonly obtained from manufacturers as a mixture containing about 60 weight percent surfactant in a mixture of isopropanol, ethylene glycol, and water. Other suitable amine salts and quaternary amine salts include (either alone or in combination in accordance with the invention), erucyl trimethyl ammonium chloride; N-methyl-N,N-bis(2-hydroxyethyl) rapeseed ammonium chloride; oleyl methyl bis(hydroxyethyl) ammonium chloride; erucylamidopropyltrimethylamine chloride, octadecyl methyl bis(hydroxyethyl) ammonium bromide; octadecyl tris(hydroxyethyl) ammonium bromide; octadecyl dimethyl hydroxyethyl ammonium bromide; cetyl dimethyl hydroxyethyl ammonium bromide; cetyl methyl bis(hydroxyethyl) ammonium salicylate; cetyl methyl bis(hydroxyethyl) ammonium 3,4,-dichlorobenzoate; cetyl tris(hydroxyethyl) ammonium iodide; cosyl dimethyl hydroxyethyl ammonium bromide; cosyl methyl bis(hydroxyethyl) ammonium chloride; cosyl tris(hydroxyethyl) ammonium bromide; dicosyl dimethyl hydroxyethyl ammonium bromide; dicosyl methyl bis(hydroxyethyl) ammonium chloride; dicosyl tris(hydroxyethyl) ammonium bromide; hexadecyl ethyl bis(hydroxyethyl) ammonium chloride; hexadecyl isopropyl bis(hydroxyethyl) ammonium iodide; and cetylamino, N-octadecyl pyridinium chloride.

Amphoteric viscoelastic surfactants are also suitable in an embodiment. Exemplary amphoteric viscoelastic surfactant systems include those described in U.S. Pat. No. 6,703,352, for example amine oxides. Other exemplary viscoelastic surfactant systems include those described in US Patent Applications 2002/0147114, 2005/0067165, and 2005/0137095, for example amidoamine oxides. These four references are hereby incorporated in their entirety. Mixtures of zwitterionic surfactants and amphoteric surfactants are suitable. An example is a mixture of about 13% isopropanol, about 5% 1-butanol, about 15% ethylene glycol monobutyl ether, about 4% sodium chloride, about 30% water, about 30% cocoamidopropyl betaine, and about 2% cocoamidopropylamine oxide (these are weight percents of a concentrate used to make the final fluid).

In an embodiment, surfactants have the additional function of dispersing or stabilizing emulsions and invert emulsions, especially where the RDF comprises an oil phase and the treatment fluid is aqueous. This may occur regardless of whether the surfactant is used as a friction reducer, viscosifier or other rheological modification, or not, i.e., the surfactant can be used as a compatibilizer to help disperse the RDF in the treatment fluid.

Surfactants, when used, are present in the treatment fluid at from 0.001 to 15 percent by weight of the liquid phase, in embodiments of up to 1 percent by weight as a friction reducer, or from 0.01 to 1 weight percent, and of from 1 to 10 weight percent as a viscoelastic thickener.

In some aspects, the invention uses treatment fluid comprising a brine carrier, separately or together with any added RDF, having a density of at least 1.02 kg/L (8.5 ppg (8.5 pounds per gallon)), but may be as low as 1 kg/L (8.3 ppg). As used herein, a heavy brine, sometimes also called a high density brine or high brine, is an aqueous inorganic salt solution having a specific gravity of greater than about 1.02 kg/L (8.5 lb/gal (ppg)), 1.08 kg/L (9 ppg) or 1.14 kg/L (9.5 ppg), especially above 1.2, 1.32, 1.44 or 1.5 kg/L (10, 11, 12 or 12.5 ppg), or up to 1.8 kg/L (15 ppg). Available water, other than brine, may also be used in some embodiments, separately or together with any added RDF, as the carrier for the treatment fluid.

When used, the brine is water comprising an inorganic salt or organic salt. Embodiments of inorganic monovalent salts include alkali metal halides, more preferably sodium, potassium or cesium bromide. Embodiments of inorganic divalent salts include calcium halides, for example, calcium chloride or calcium bromide. Zinc halides, especially zinc bromide, may also be used. Inorganic salt can be added to the carrier fluid in any hydration state (i.e. anhydrous, monohydrated, dihydrated, etc.). The carrier brine phase may also comprise an organic salt, in embodiments sodium or potassium formate, acetate or the like, which may be added to the treatment fluid up to a concentration at which phase separation might occur, approximately 1.14 kg/L (9.5 ppg). In an embodiment, mixture of organic and inorganic salts can achieve a density higher than about 1.2 kg/L (10 ppg).

The salt in one embodiment is compatible with the drilling fluid that was used to drill the wellbore, e.g. the salt in the treatment fluid used as a prepad or preflush, or in a completion/clean up fluid, can be the same as the salt used in the drilling fluid.

The fluids used in some embodiments of the invention may include an additional electrolyte, which may be an organic acid, organic acid salt, organic salt, or inorganic salt. Mixtures of the above members are specifically contemplated as falling within the scope of the invention. This member will typically be present in a minor amount (e.g. less than about 30% by weight of the liquid phase). The organic acid is typically a sulfonic acid or a carboxylic acid, and the anionic counter-ion of the organic acid salts is typically a sulfonate or a carboxylate. Representative of such organic molecules include various aromatic sulfonates and carboxylates such as p-toluene sulfonate, naphthalene sulfonate, chlorobenzoic acid, salicylic acid, phthalic acid and the like, where such counter-ions are water-soluble. Particularly useful organic acids are formic acid, citric acid, 5-hydroxy-1-napthoic acid, 6-hydroxy-1-napthoic acid, 7-hydroxy-1-napthoic acid, 1-hydroxy-2-naphthoic acid, 3-hydroxy-2-naphthoic acid, 5-hydroxy-2-naphthoic acid, 7-hydroxy-2-napthoic acid, 1,3-dihydroxy-2-naphthoic acid, and 3,4-dichlorobenzoic acid. The inorganic salts that are particularly suitable include, but are not limited to, water-soluble potassium, sodium, and ammonium salts, such as potassium chloride and ammonium chloride.

Friction reducers, separately added or present in the RDF component, may also be incorporated into fluids of the invention. Any friction reducer may be used. In addition, polymers such as polyacrylamide, polyisobutyl methacrylate, polymethyl methacrylate and polyisobutylene as well as water-soluble friction reducers such as guar gum, guar gum derivatives, hydrolyzed polyacrylamide, and polyethylene oxide may be used. Commercial drag reducing chemicals such as those sold by Conoco Inc. under the trademark "CDR" as described in U.S. Pat. No. 3,692,676 (Culter et al.) or drag reducers such as those sold by Chemlink designated under the trademarks "FLO 1003, 1004, 1005 & 1008" have also been found to be effective. These polymeric species added as friction reducers or viscosity index improvers may also act as fluid loss additives reducing or even eliminating the need for conventional fluid loss additives.

A fiber component may be included in the treatment fluids used in the invention to achieve a variety of properties including improving particle suspension, and particle transport capabilities, and gas phase stability. Fibers used may be hydrophilic or hydrophobic in nature, but hydrophilic fibers are particularly useful. Fibers can be any fibrous material, such as, but not necessarily limited to, natural organic fibers, comminuted plant materials, synthetic polymer fibers (non-limiting examples including polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) Fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like. When used in fluids of the invention, the fiber component may be included at concentrations from about 1 to about 15 grams per liter of the liquid phase of the fluid, more particularly, the concentration of fibers may be from about 2 to about 12 grams per liter of liquid, and more particularly, from about 2 to about 10 grams per liter of liquid.

Embodiments of the invention may use other additives and chemicals that are known to be commonly used in oilfield applications by those skilled in the art. These include, but are not necessarily limited to, materials in addition to those mentioned hereinabove, such as breaker aids, amino acids, oxygen scavengers, alcohols, scale inhibitors, corrosion inhibitors, fluid-loss additives, bactericides, iron control agents, organic solvents, and the like.

A buffering agent may be employed to buffer the fluids according to an embodiment, i.e., moderate amounts of either a strong base or acid may be added without causing any large change in pH value of the fracturing fluid. In various embodiments, the buffering agent is a combination of a weak acid and a salt of the weak acid; an acid salt with a normal salt; or two acid salts. Examples of suitable buffering agents are sodium carbonate-sodium bicarbonate, sodium bicarbonate, or other like agents. By employing a buffering agent instead of merely a hydroxyl ion producing material, a fracturing fluid is provided which is more stable to a wide range of pH values found in local water supplies and to the influence of acidic materials located in formations and the like. In an exemplary embodiment, the pH control agent is varied between about 0.6 percent and about 40 percent by weight of the polysaccharide employed.

Some fluid compositions useful in some embodiments of the invention may also include a gas component, produced from any suitable gas that forms an energized fluid or foam when introduced into an aqueous medium. See, for example, U.S. Pat. No. 3,937,283 (Blauer et al.) incorporated herein by reference. Preferably, the gas component comprises a gas selected from the group consisting of nitrogen, air, argon, carbon dioxide, natural gas, and any mixtures thereof. In an embodiment, the gas component comprises nitrogen or carbon dioxide, in any quality readily available. The gas component may assist in the fracturing and acidizing operation, as well as the well clean-up process. The fluid in one embodiment may contain from about 10% to about 90% or more volume gas component based upon total fluid volume percent, preferably from about 20% to about 80% volume gas component based upon total fluid volume percent, and more preferably from about 30% to about 70% volume gas component based upon total fluid volume percent.

Embodiments of the invention may also include proppant particles that are insoluble in the fluids of the formation. Proppant particles carried by the treatment fluid remain in the fracture created, thus propping open the fracture when the fracturing pressure is released and the well is put into production. Suitable proppant materials include, but are not limited to, sand, walnut shells, sintered bauxite, glass beads, ceramic materials, naturally occurring materials, or similar materials. Mixtures of proppants can be used as well. If sand is used, it will typically be from about 20 to about 100 U.S. Standard Mesh (approx. 0.84 mm to 0.15 mm) in size. Naturally occurring materials may be underived and/or unprocessed naturally occurring materials, as well as materials based on naturally occurring materials that have been processed and/or derived. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of particalization, processing, etc. Further information on nuts and composition thereof may be found in Encyclopedia of Chemical Technology, Edited by Raymond E. Kirk and Donald F. Othmer, Third Edition, John Wiley & Sons, Volume 16, pages 248-273 (entitled "Nuts"), Copyright 1981, which is incorporated herein by reference. In addition, any of the proppant particles can further be coated with a resin to potentially improve the strength, clustering ability, and flow back properties of the proppant. In further or alternative embodiment, particles present in the RDF used as or diluted into the treatment fluid, can function as proppant in the treatment fluid. In an embodiment, the size distribution of the particles in the RDF can be modified by processing of the RDF prior to or subsequent to recovery from the drilling operation, e.g., by screening the drilling fluid slurry or the drill cuttings, for undersize and/or oversized particles.

The concentration of proppant in the fluid can be any concentration known in the art, and, as an example, may be in the range of from about 0.01 to about 3 grams of proppant added per mL of liquid phase (g/mL-a) (about 0.08 to about 25 pounds of proppant added per gallon of fluid (ppa)). In an embodiment, the proppant concentration is from 0.03 g/mL to 0.12 g/mL-a (0.25 to 1.0 ppa).

Conventional propped hydraulic fracturing techniques, with appropriate adjustments if necessary, as will be apparent to those skilled in the art, are used in the methods of the invention. In an example of a fracture stimulation treatment, the treatment may begin with a pad stage to generate the fracture, followed by a sequence of stages in which a viscous or slickwater carrier fluid transports proppant into the fracture as the fracture is propagated, wherein at least one of the pad and/or proppant stages comprises RDF. Typically, in this sequence of stages the amount of propping agent is increased, normally stepwise. The pad and carrier fluid can be a gelled aqueous fluid or a low viscosity aqueous fluid containing a friction reducer, i.e., slickwater.

The pad and carrier fluids may contain, in addition to any RDF, various additives. Non-limiting examples are fluid loss additives, crosslinking agents, clay control agents, breakers, iron control agents, and the like, provided that the additives do not affect the stability or action of the fluid. In embodiments, the RDF may be present in each of the pad and proppant stages, or in the prepad or postflush stages. In an embodiment, one or more stages may contain the RDF, which may or may not mix downhole with one or more other stages without RDF. In addition, the RDF-containing treatment fluid can be pumped in early, middle or later stages to place the RDF components where the fracture characteristics will be best enhanced thereby, and/or least adversely impacted thereby, as the case may be.

In an embodiment, the RDF can be used as obtained from the drilling operation at the treatment well site or a remote well site location, or diluted or mixed, either at the well site or at a remote location prior to use at the wellsite, for addition to the treatment fluid. The RDF can be added separately to the treatment fluid in the treatment fluid mixing tanks, or as an additive stream injected into a stream of the treatment fluid just prior to or during injection into the wellbore, during transit in the wellbore, or adjacent entry into a formation, e.g. by supplying the RDF as a pumpable fluid stream at high pressure via a separate tubing, or the like. The treatment fluid additives can be added with the RDF or in admixture therewith, in embodiments. In one embodiment, the RDF is added to the carrier fluid before or after hydration of the polymer, if used, and/or with other additives to the treatment fluid before injection into the well head.

The procedural techniques for pumping fluids down a wellbore to treat a subterranean formation can be facilitated by many useful tools to help design and implement treatments, one of which is a computer program commonly referred to as a fracture simulation model (also known as fracture models, fracture simulators, and fracture placement models). One commercial fracture simulation model that is widely used by several service companies is known as FracCADE™. This commercial computer program is a fracture design, prediction, and treatment-monitoring program designed by Schlumberger, Ltd. All of the various fracture simulation models use information available to the treatment designer concerning the formation to be treated and the various treatment fluids (and additives) in the calculations, and the program output is a pumping schedule that is used to pump the fracture stimulation fluids into the wellbore. The text "Reservoir Stimulation," Third Edition, Edited by Michael J. Economides and Kenneth G. Nolte, Published by John Wiley & Sons, (2000), is an excellent reference book for fracturing and other well treatments; it discusses fracture simulation models in Chapter 5 (page 5-28) and the Appendix for Chapter 5 (page A-15)), which are incorporated herein by reference.

Example 1 estimated fracture conductivity. In this example, a sample of used water-based drilling mud was obtained from a well drilling into a Barnett shale having a permeability of 300 nanodarcy (nD). The solids content of the as-received sample was about 7.5 percent by weight, and the viscosity was 14 mPa-s (14 cp) at ambient temperature of about 20° C. (68° F.) and a shear rate of 511 s$^{-1}$. By drying a portion of the sample and scinitillographic analysis of the resulting solids, the mean particle size of the drilling fluid solids was 32 microns. The permeability of a proppant pack of solids with this particle size distribution ($K_f$, square microns) was estimated using the Kozeny-Carman equation, $K_f=(c)(D^2)(\epsilon^2)/(150)((1-\epsilon)^2)=84$ millidarcy (mD), wherein c is a constant equal to 0.2, D is average particle diameter (microns), $\epsilon$ is average porosity assumed to be 0.20 (20%).

The dimensionless conductivity ($F_{cD}$) can be estimated according to the formula: $F_{cD}=(k_f)(W)/(k_r)(L)$, wherein $k_f$ is permeability of a proppant pack in the fracture, W is width of the fracture, $k_r$ is permeability of the tight subterranean formation and L is length of the fracture. For a 3 mm (0.125-in.) fracture width and 150 m (490 ft) fracture length, calculated value of estimated $F_{cD}=(84\ mD)(0.003\ m)/(0.0003\ mD)(150$ m)=5.6. A fracture made with a proppant pack from the residual drilling fluid solids should thus have a suitable conductivity to enhance gas production from the Barnett shale formation.

Example 2 fracture of Barnett shale with residual drilling fluid. In this example, a horizontal well is drilled in the 300 nD Barnett shale of example 1. The residual drilling fluid following the drilling operation is recovered in a quantity of 150 m³ (950 bbl). The well is fractured with a slickwater formulation prepared from the RDF diluted in fresh water, according to the following pump schedule in Table 1, with an added commercial friction reducer.

TABLE 1

RDF-Fracturing Pumping Schedule

| Stage Name | Pump Rate, m³/min (bbl/min) | Fluid Volume, m³ (bbl) | RDF Conc., volume % | RDF Volume, m³ (bbl) | Proppant Conc., kg/L (ppa) | Proppant Mass, kg (lb) | Slurry Volume, m³ (bbl) | Pump Time, minutes |
|---|---|---|---|---|---|---|---|---|
| Pad | 12.7 (80) | 397 (2500) | 0 | 0 (0) | 0 (0) | 0 (0) | 397 (2500) | 31.25 |
| 0.25 PPA | 12.7 (80) | 159 (1000) | 20 | 31.8 (200) | 0.03 (0.25) | 4770 (10500) | 161 (1011) | 12.64 |
| 0.5 PPA | 12.7 (80) | 159 (1000) | 20 | 31.8 (200) | 0.06 (0.5) | 9540 (21000) | 162 (1023) | 12.78 |
| 0.75 PPA | 12.7 (80) | 159 (1000) | 25 | 39.7 (250) | 0.09 (0.75) | 14300 (31500) | 164 (1034) | 12.92 |
| 1.0 PPA | 12.7 (80) | 159 (1000) | 30 | 47.7 (300) | 0.12 (1) | 19100 (42000) | 166 (1045) | 13.07 |
| Flush | 12.7 (80) | 38 (238) | 0 | 0 (0) | 0 (0) | 0 (0) | 0 (0) | 2.98 |

The foregoing description is illustrative of embodiments of the invention, but should not be construed as a limitation on the scope of the invention, which is to be determined from the content and spirit of the appended claims.

We claim:

1. A method, comprising:
fracturing a tight gas formation wherein a treatment fluid comprising residual drilling fluid is injected into the formation to form a fracture with a consolidated proppant pack having a relatively higher conductivity than the formation, wherein the fracturing step comprises injection of treatment fluid in stages comprising a residual drilling fluid-rich treatment fluid stage and a residual drilling fluid-lean treatment fluid stage;
producing gas, gas condensate or a combination thereof from the formation through the fracture and into a production conduit in fluid communication therewith.

2. The method of claim 1 wherein the proppant pack has a dimensionless conductivity ($F_{cD}$) of at least about 2, wherein $F_{cD} = (k_f)(W)/(k_r)(L)$, wherein $k_f$ is permeability of the proppant pack, W is width of the fracture, $k_r$ is permeability of the tight subterranean formation, and L is length of the fracture, wherein $k_r$ is less than 1 millidarcy.

3. The method of claim 1 wherein the residual drilling fluid is recovered from a drilling operation to form a borehole penetrating the tight gas formation, wherein the production conduit is disposed in the borehole.

4. The method of claim 1 wherein the residual drilling fluid is supplied from a remote well site.

5. A method, comprising the steps of:
drilling a borehole into a subterranean formation;
recovering residual drilling fluid from the drilling step;
stimulating a pay zone in the subterranean formation by injecting a treatment fluid into the pay zone, wherein the stimulation step comprises injection of the treatment fluid in stages comprising a residual drilling fluid-rich treatment fluid stage and a residual drilling fluid-lean treatment fluid stage;
supplying the residual drilling fluid from the recovery step to the treatment fluid for the pay zone stimulation step;
producing hydrocarbon from the stimulated pay zone.

6. The method of claim 5 wherein the subterranean formation comprises shale.

7. The method of claim 5 wherein the subterranean formation has a permeability less than about 1 millidarcy.

8. The method of claim 5 wherein the treatment forms a fracture in the pay zone having a dimensionless conductivity ($F_{cD}$) of at least about 0.1, wherein $F_{cD} = (k_f)(W)/(k_r)(L)$, wherein $k_f$ is permeability of a proppant pack in the fracture, W is width of the fracture, $k_r$ is permeability of the subterranean formation and L is length of the fracture.

9. The method of claim 5 wherein the stimulation step comprises hydraulic fracturing of the pay zone.

10. The method of claim 5 wherein the treatment fluid comprises the neat residual drilling fluid.

11. The method of claim 5 wherein the treatment fluid comprises a ratio of from 100:1 to 1:1000 by volume of residual drilling fluid to volume of diluent fluid.

12. The method of claim 5 wherein supplying the residual drilling fluid to the stimulation step disposes of substantially all of the residual drilling fluid.

13. The method of claim 5 comprising well-site storage of the residual drilling fluid between the recovery and stimulation steps.

14. The method of claim 5 further comprising importing residual drilling fluid recovered from another drilling operation to the treatment fluid for the pay zone stimulation step.

15. The method of claim 5 comprising conditioning the residual drilling fluid for a property selected from the group consisting of pH, viscosity, density, solids content, salinity, and any combination thereof.

16. The method of claim 5 further comprising the step of mixing an additive into the treatment fluid, wherein the additive is selected from the group consisting of proppants, thickeners, breakers, activators, pH control agents, biocides, corrosion inhibitors, electrolytes, and any combination thereof.

17. The method of claim 5 wherein the stimulation step comprises a slickwater treatment stage.

18. The method of claim 5 wherein the treatment fluid comprises stimulation fluid recovered from a previous stimulation treatment at the same or a different well or formation.

19. The method of claim 5 wherein the produced hydrocarbon comprises gas, gas condensate or a combination thereof.

20. The method of claim 5 wherein the stimulating step comprises resin consolidation of a proppant in a fracture adjacent the borehole.

21. The method of claim 5 wherein at least one stage of the treatment fluid comprises resin-coated proppant suspended therein.

22. The method of claim 5 wherein at least one stage of the treatment fluid comprises resin to consolidate the proppant.

23. A method, comprising the steps of:
   drilling a borehole into a tight subterranean formation;
   recovering residual drilling fluid from the drilling step;
   repeatedly stimulating a pay zone in the subterranean formation by a series of successive injections of treatment fluid into the pay zone to form a plurality of fractures comprising a consolidated proppant pack, wherein the stimulation step comprises injection of the treatment fluid in stages comprising a residual drilling fluid-rich treatment fluid stage and a residual drilling fluid-lean treatment fluid stage;
   supplying the residual drilling fluid from the residual drilling fluid recovery step to the treatment fluid for at least a portion of one or more of the injections in the pay zone stimulation step;
   recovering a portion of treatment fluid used in one or more of the injections;
   supplying the used treatment fluid from the treatment fluid recovery step to the treatment fluid for a later one or more of the successive injections;
   producing hydrocarbon from the stimulated pay zone.

* * * * *